(12) United States Patent
Lee (10) Patent No.: US 10,315,694 B2
(45) Date of Patent: Jun. 11, 2019

(54) TORQUE SENSOR MODULE, STEERING ANGLE SENSING DEVICE, AND STATOR MANUFACTURING METHOD

(71) Applicant: LG INNOTEK CO., LTD., Seoul (KR)

(72) Inventor: Chang Hwan Lee, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 0 days.

(21) Appl. No.: 15/564,032

(22) PCT Filed: Mar. 23, 2016

(86) PCT No.: PCT/KR2016/002894
§ 371 (c)(1),
(2) Date: Oct. 3, 2017

(87) PCT Pub. No.: WO2016/167486
PCT Pub. Date: Oct. 20, 2016

(65) Prior Publication Data
US 2018/0086375 A1    Mar. 29, 2018

(30) Foreign Application Priority Data
Apr. 13, 2015 (KR) .......................... 10-2015-0051709

(51) Int. Cl.
*B62D 6/10* (2006.01)
*G01D 5/14* (2006.01)
(Continued)

(52) U.S. Cl.
CPC ................. *B62D 6/10* (2013.01); *G01B 7/30* (2013.01); *G01D 5/14* (2013.01); *G01L 3/10* (2013.01); *G01L 3/104* (2013.01)

(58) Field of Classification Search
CPC ......... G01L 1/125; G01L 3/101; G01L 3/102; G01L 3/106; G01L 3/1492; G01L 3/10; G01D 5/14; G01B 7/30; B62D 6/10
(Continued)

(56) References Cited

U.S. PATENT DOCUMENTS 2,607,816 A * 8/1952 Ryder .................... H02K 1/148
                                                    29/416
7,026,741 B2 * 4/2006 Nishiyama .............. F04B 35/04
                                                    310/216.065
(Continued)

FOREIGN PATENT DOCUMENTS

| JP | 2011-244675 | 12/2011 |
| KR | 10-1238594 | 2/2013 |
| KR | 10-1243535 | 3/2013 |

OTHER PUBLICATIONS

International Search Report (with English Translation) and Written Opinion dated Jun. 2, 2016 issued in Application No. PCT/KR2016/002894.

*Primary Examiner* — Jonathan M Dunlap
*Assistant Examiner* — Octavia Hollington
(74) *Attorney, Agent, or Firm* — KED & Associates, LLP (57) ABSTRACT

The disclosure relates to a torque sensor module comprising: a rotor (including a rotor holder and a first magnet); and a stator formed by a plurality of unit stators to be divided. Each of the unit stators separately includes a head part and a tooth that extends in a bent direction from the corresponding head part.

12 Claims, 6 Drawing Sheets

(51) Int. Cl.
    *G01B 7/30*    (2006.01)
    *G01L 3/10*    (2006.01)
(58) Field of Classification Search
    USPC ............... 73/862.193, 862.331–862.338
    See application file for complete search history.

(56) References Cited

U.S. PATENT DOCUMENTS

| | | | | |
|---|---|---|---|---|
| 7,042,130 | B2* | 5/2006 | Zepp | H02K 1/148 |
| | | | | 310/216.102 |
| 8,294,326 | B2* | 10/2012 | Chai | H02K 1/148 |
| | | | | 310/216.044 |
| 8,887,580 | B2* | 11/2014 | Nishikawa | G01L 3/101 |
| | | | | 73/862.331 |
| 9,667,104 | B2* | 5/2017 | Chang | H02K 1/148 |
| 2002/0145359 | A1 | 10/2002 | Nishiyama et al. | |
| 2009/0195112 | A1 | 8/2009 | Chai et al. | |
| 2012/0086300 | A1* | 4/2012 | Kim | H02K 1/148 |
| | | | | 310/215 |

* cited by examiner

TORQUE SENSOR MODULE, STEERING ANGLE SENSING DEVICE, AND STATOR MANUFACTURING METHOD

CROSS-REFERENCE TO RELATED PATENT APPLICATIONS

This application is a U.S. National Stage Application under 35 U.S.C. § 371 of PCT Application No. PCT/KR2016/002894, filed Mar. 23, 2016, which claims priority to Korean Patent Application No. 10-2015-0051709, filed Apr. 13, 2015, whose entire disclosures are hereby incorporated by reference.

TECHNICAL FIELD

The teachings in accordance with exemplary and non-limiting embodiments of this disclosure relate generally to a torque angle sensor, an apparatus for sensing steering angle, and a method for manufacturing a stator.

BACKGROUND ART

In general, almost every vehicle employs a steering system that assists using a separate power as a device for guaranteeing a steering stability of the vehicle. Conventionally, the auxiliary steering device uses hydraulic pressure, but an EPS (Electronic Power Steering) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is such that an ECU (Electronic Control Unit) drives a motor in response to steering conditions detected by a speed sensor, a torque angle sensor and a torque sensor to enhance a steering stability and provide a quick restoring force, whereby a driver can safely steer a vehicle.

The torque sensor in the EPS is configured such that a magnet is disposed along a periphery of a rotor, and a stator formed with a lug piece corresponding to a polarity of the magnet is disposed at a periphery thereof, where magnetic charge is outputted in response to a difference of mutual rotations to detect torques of input shaft and output shaft, and the torques are transmitted to an ECU. In addition, a torque angle sensor detects a torque applied to a steering shaft, outputs an electric signal proportional to the detected torque, and outputs an electric signal proportional to a rotation angle of the steering shaft.

In this configuration, the stator is realized by an integral structure having a plurality of protruding pieces, which is in turn realized by a method of processing in an integral structure from a single sheet at the time of manufacturing, resulting in a disadvantageous problem of generating a loss of cost due to increased waste of raw materials.

DETAILED DESCRIPTION OF THE INVENTION

Technical Subject

The exemplary and non-limiting embodiments of this disclosure are provided to solve the aforementioned disadvantages of the prior art, and particularly, an object of the present disclosure is to reduce a manufacturing cost by realizing a stator structure in a structure where a plurality of unit stators is separately manufactured and coupled, and to secure a versatile applicability in manufacturing design in response to motor size.

Technical Solution

In order to solve the technical subject, and in one general aspect of the present disclosure, there is provided a torque sensor module, comprising:

a rotor including a rotor holder and a first magnet disposed at a periphery of the rotor holder; and a stator disposed at an external side of the rotor by being spaced apart from the rotor, wherein the stator is formed by allowing a plurality of divided unit stator teeth to be coupled.

Preferably, but not necessarily, each of the plurality of unit stator teeth may include a head part extended to a circumferential direction, and a tooth extended from the head part by being bent to a vertical direction.

Preferably, but not necessarily, the plurality of unit stator teeth may include a first stator tooth including a first head part, and a second stator tooth including a second head part most adjacently positioned with the first head part in the plurality of unit stator teeth.

Preferably, but not necessarily, the first and second head parts may be spaced apart from each other.

Preferably, but not necessarily, the first and second head parts may be coupled by a coupling member.

Preferably, but not necessarily, the first and second head parts may be coupled by a binding part.

Preferably, but not necessarily, the binding part may be formed by allowing the first and second head parts to be directly melted.

Preferably, but not necessarily, each of the plurality of unit stator teeth may be identical in terms of size and shape of tooth to that of the head part.

Preferably, but not necessarily, the torque sensor module may further comprise:

a magnetic field sensor detecting a magnetic field change in response to movement of the first magnet; and a collector disposed at the stator to apply the magnetic field change in response to the movement of the first magnet to the magnetic field sensor.

Preferably, but not necessarily, the number of the plurality of unit stator teeth may be of an integer ratio of the number of electrodes magnetized to the first magnet.

Preferably, but not necessarily, the plurality of unit stator teeth may be disposed to a circumferential direction, where each of adjacent unit stator teeth may be alternately arranged.

Preferably, but not necessarily, the rotor may be coupled to an input shaft, and the stator may be coupled to an output shaft.

In another general aspect of the present disclosure, there is provided an apparatus for sensing a steering angle, the apparatus comprising:

a rotor including a rotor holder and a first magnet disposed at a periphery of the rotor holder;

a stator disposed at an external side of the rotor by being spaced apart from the rotor, and a gear module interacting by being coupled to the stator; wherein the stator is formed by allowing a plurality of divided unit stator teeth to be coupled.

Preferably, but not necessarily, the gear module may include a main gear interacting with the stator, a first sub gear and a second sub gear coupled to the main gear;

wherein each rotational center of the first sub gear and the second sub gear is disposed with a second magnet and a third magnet.

Preferably, but not necessarily, the first magnet may be coupled to an input shaft or an output shaft, and may be magnetized to an axial direction.

Preferably, but not necessarily, the first magnet may take a ring-shape having a hollow hole at an inside with a shape of a horizontal cross-section having an external diameter and a minor diameter.

In still another general aspect of the present disclosure, there is provided a method for manufacturing a stator, the method comprising:

preparing a plate-type substrate material (a); and cutting a plurality of unit stator teeth from the substrate material (b), wherein the plurality of unit stator teeth includes a first stator tooth having a first tooth and a first head part extended from the first tooth, and a second stator tooth having a second tooth most adjacently positioned to the first tooth and the substrate material, and a second head part extended from the second tooth, and wherein the (b) step of cutting the plurality of unit stator teeth from the substrate material includes aligning the first stator tooth and the second stator tooth to allow the first head part to be positioned at an upper surface of the substrate material and to allow the second head part to be positioned at a bottom surface of the substrate material.

Preferably, but not necessarily, the method may comprise, after (b) step, bending teeth relative to the head part from the plurality of unit stator teeth cut at the (b) step (c); and coupling the plurality of unit stator teeth by aligning the plurality of unit stator teeth to a circumferential direction (d).

Preferably, but not necessarily, the plurality of unit stator teeth at the (d) step may be so coupled as to allow adjacent head parts to be mutually positioned in a zigzagged way.

Preferably, but not necessarily, coupling of among the plurality of unit stator teeth at the (d) step may be made by any one or more methods of an insert molding, an ultrasonic fusion, a thermal fusion, a caulking and a bonding.

As a means to solve the above technical subjects, an exemplary embodiment of the present disclosure may provide a torque sensor module that includes a yoke member disposed at a periphery of a rotor holder connected to an input shaft through a hollow hole, a rotor coupled by a first magnet, and a stator connected to an output shaft by being discretely disposed at a periphery of the rotor, where the stator is coupled by being divided to a plurality of unit stators, and arranged to a radial direction of a periphery of the first magnet.

Furthermore, another exemplary embodiment of the present disclosure may be realizeds by an apparatus for sensing steering angle that includes, by applying the abovementioned torque sensor module, a yoke member disposed at a periphery of a rotor holder connected to an input shaft through a hollow hole, a rotor coupled by a first magnet, a stator connected to an output shaft by being discretely disposed at a periphery of the rotor, coupled by allowing at least two unit stators to be divided, and connected to an output shaft by being disposed to a radial direction of a periphery of the first magnet, a main gear rotating along with the stator by being coupled to a bottom side of the stator, and a gear module that interacts with the main gear to include a plurality of sub gears including a second magnet and a third magnet.

Advantageous Effects of the Disclosure

The advantageous effect according to the exemplary embodiment of the present disclosure is that a manufacturing cost can be reduced by realizing a stator structure in a structure where a plurality of unit stators is separately manufactured and coupled, and a versatile applicability can be secured in manufacturing design in response to motor size.

BEST MODE

Structures and operations of the present disclosure will be explained in detail with reference to the accompanying drawings. Furthermore, throughout the descriptions, the same reference numerals will be assigned to the same elements in the explanations of the figures, and explanations that duplicate one another will be omitted.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

Figure 1:
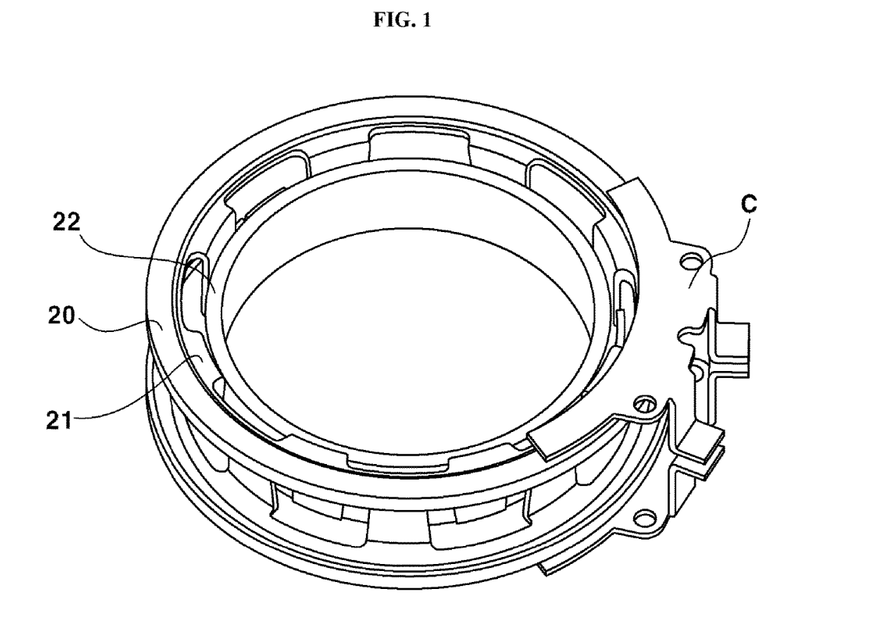
FIGS. 1 and 2 are schematic views illustrating a comparative structure of a torque sensor module according to an exemplary embodiment of the present disclosure.
Figure 2:
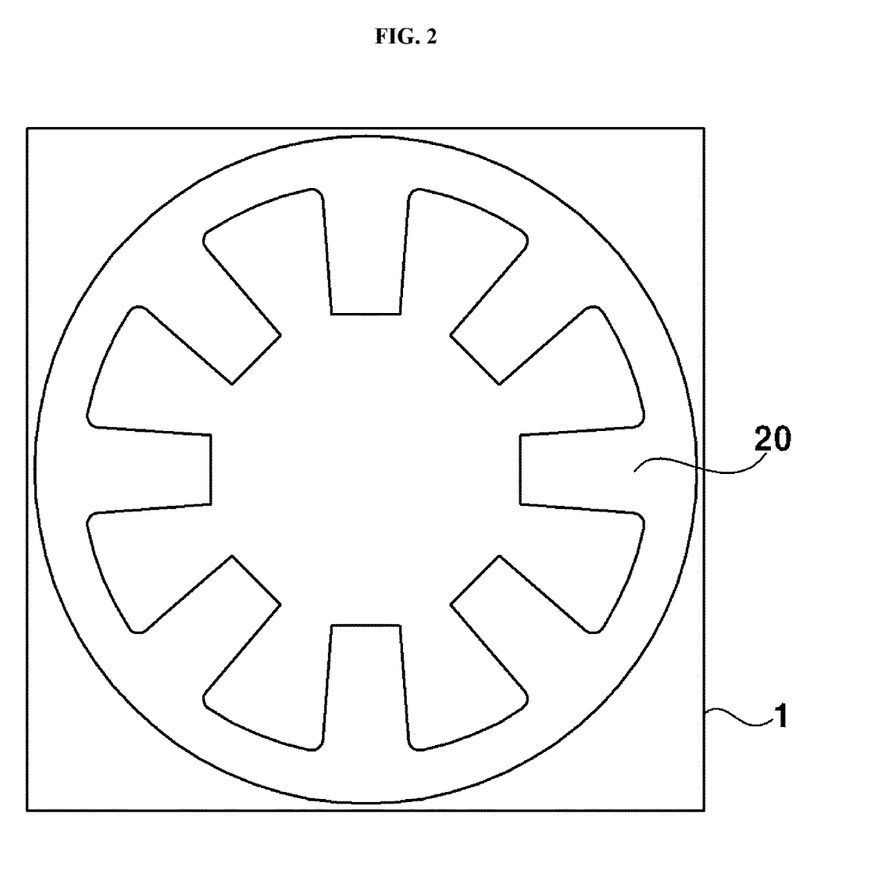
Figure 3:
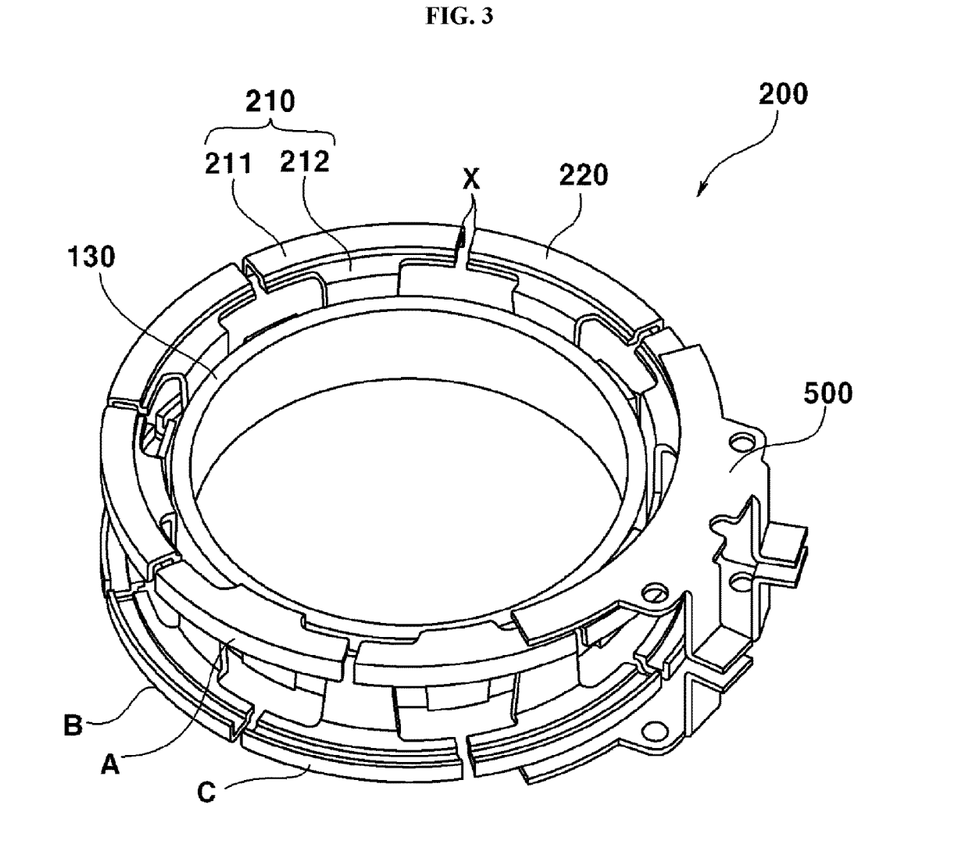
FIGS. 3 and 4 are schematic conceptive views illustrating a structure of a torque sensor module according to an exemplary embodiment of the present disclosure.
Figure 4:
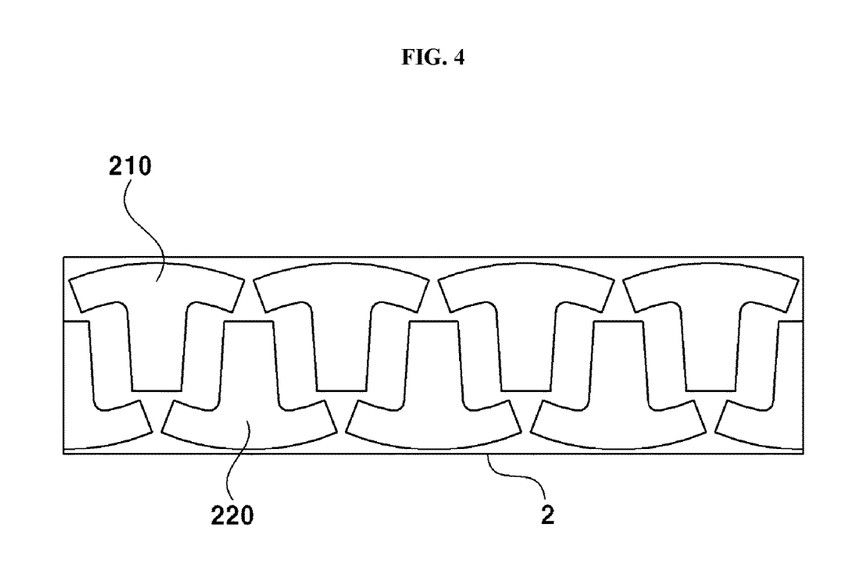

FIGS. 1 and 2 are schematic views illustrating a comparative structure of a torque sensor module according to an exemplary embodiment of the present disclosure, and FIGS. 3 and 4 are schematic conceptive views illustrating a structure of a torque sensor module according to an exemplary embodiment of the present disclosure.

Referring to FIGS. 1 and 2, in general, a stator (200) is realized by a ring-shaped stator structure where a plurality of teeth (21) is integrally realized by being connected to edges of an upper side and a bottom side. In this case, the stator may be disposed at an inner side with a magnet (22), and the magnet (22) may be disposed at an inner side with a rotor assembly (not shown) including a rotor holder or a yoke member.

Referring to FIG. 2 again, the abovementioned stator (200) may be realized by a substrate (1) of a predetermined size being aligned, cut out in a shape of FIG. 2 through a press processing, where the same cut-out shape is coupled from up and down to form one stator. However, this process has a disadvantage in that areas other than an area forming the stator is disposed of at the time of cutting process to thereby increase the material loss which is a very high priced alloy material. In addition, there is also generated an applicability limit because only an initially designed size (dimension) can be applied.

In order to solve the foregoing disadvantages, a structure of torque sensor module according to an exemplary embodiment of the present disclosure can be realized to remove the said applicability limit, as illustrated in FIGS. 3 and 4.

That is, as illustrated in FIG. 3, a plurality of unit stator teeth (210, 220) is divisibly manufactured, and mutually coupled to realize a stator (200). Particularly, instead of bonding an up/down substrate structure integrally formed as shown in FIG. 2, the unit stator teeth (210, 220) may be alternately aligned to form a ring-shaped stator (200).

Inter alia, this type of structure can promote the convenience of process in the manufacturing process, and significantly reduce the waste of materials as well. That is, when a structure of base substrate material (2) is alternately aligned with a plurality of unit stator teeth (210, 220) which is then cut, a plurality of unit stator teeth (210, 220) may be realized as shown in FIG. 4. The plurality of unit stator teeth (210, 220) may be realized by a structure where a tooth (212) is realized that is protruded by being extended from a head part (211).

Thereafter, the plurality of unit stator teeth (210, 220) is so aligned as to allow a lateral surface of the head part (211) to be reached by and between the mutually adjacent unit stator teeth (210, 220) as illustrated in FIG. 3, whereby a borderline of the mutually adjacent unit stator teeth (210, 220) may be realized. In case of this separately coupled structure, a design change within an error scope necessary for extension or reduction process of fine dimensions can be freely realized, and when the number and curvature of the unit stator teeth (210, 220) are change, manufacturing can be made by further extension or reduction of radius of the stator (200), whereby an advantage of realizing adequate application can be made even in dimensions of various torque sensors.

For example, when the unit stator tooth (210) is arranged in a ring structure along a curvature radius direction of a periphery of the first magnet (130) having a predetermined curvature, and when a curvature of the head part (211) of the unit stator teeth (210, 220) is realized in a greater or smaller size under a cut process of FIG. 4, it is possible to easily realize the size control of the entire stator (200).

In addition, a spatial efficiency can be further increased and the number of unit stator teeth (A, B, C) can be increased as well by realizing a structure in which direction of tooth (212) extended from the head part (211) in an alignment structure of other unit stator teeth (B, C) adjacent to both sides of one unit stator tooth (A) is mutually and alternately arranged. Particularly, in the exemplary embodiment of the present disclosure, the magnetization characteristic can be uniformly realized by allowing each gap to be uniformly realized when the head part (211) and the tooth (212) are prepared in mutually same size (dimension). More preferably, the efficiency of magnetization characteristic can be realized by allowing the number of unit stator teeth (210, 220) to be of an integer ratio of the number of electrodes magnetized to the first magnet (130).

Although not illustrated in FIG. 3, head parts (211) of mutually adjacent unit stator teeth (210, 220) are so arranged as to abut to each other, whereby the stator (200) is realized to bond the head parts, and particularly in the exemplary embodiment of the present disclosure, a binding part (X) for binding each head part (211) may be formed between the mutually adjacent unit stator teeth (210, 220) in the plurality of unit stator teeth (210, 220).

That is, in case of the binding part (X), the head part (211) of the mutually adjacent unit stator teeth (210, 220) may be formed using insert molding, ultrasonic fusion, thermal fusion, caulking or adhesion using an adhesive. In this case, the magnetization characteristic can be further promoted by realizing a structure in which each head part (211) of the unit stator teeth (210, 220) is directly fused in addition to using a separate intermediation member.

Figure 5:
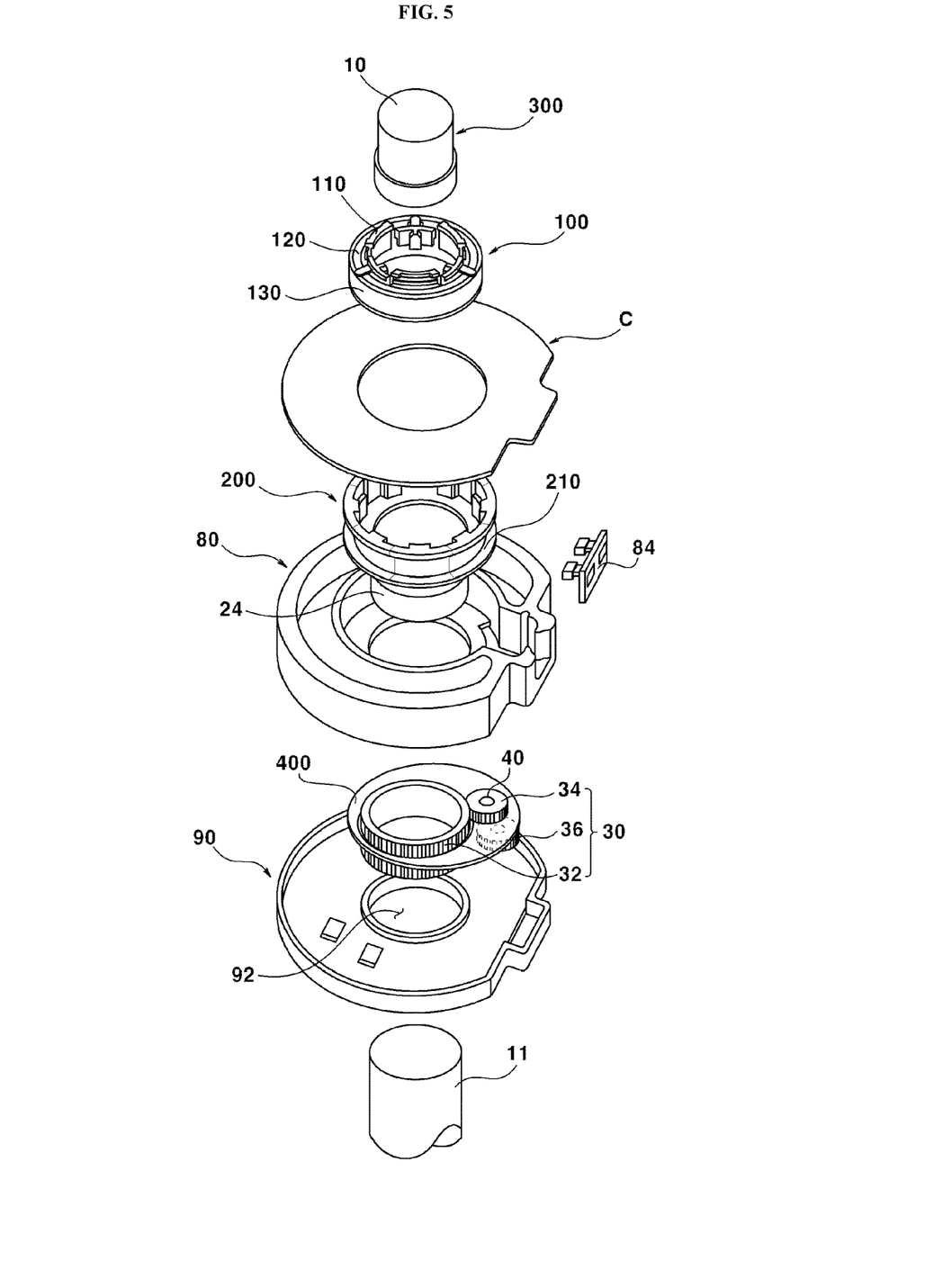
FIG. 5 is an exploded view illustrating an apparatus for sensing steering angle applied with a torque sensor module according to an exemplary embodiment of the present disclosure.

FIG. 5 is an exploded view illustrating an apparatus for sensing steering angle applied with a torque sensor module according to an exemplary embodiment of the present disclosure as discussed in FIGS. 3 and 4.

Referring to FIG. 5, a structure of an apparatus for sensing steering angle (300, hereinafter referred to as "a steering angle sensing apparatus") applied with a torque sensor module according to an exemplary embodiment of the present disclosure.

The steering angle sensing apparatus (300) may include a yoke member (120) formed at a periphery of a rotor holder (110) connected to an input shaft (10) through a hollow hole, and a rotor (100) coupled by a first magnet (130). In addition, the apparatus (300) may further include a stator (200) discretely arranged from a periphery of the rotor (100) to be connected to an output shaft (11), a main gear (32) coupled to a bottom side of the stator (200) to rotate along with the stator (200) and a gear module (30) interacting with the main gear (32) to include a plurality of sub gears (34, 36) including a second magnet (40) and a third magnet (50). In this case, the rotor (100) and the stator (200) may form a torque sensor module.

To be more specific, in case of torque sensor module, the first magnet (130) is arranged along the periphery of the rotor (100), whereby a magnetic amount can be detected in response to a difference of mutual rotation to detect a torque of the input shaft (10) and the output shaft (11), which is then transmitted to an electronic control device.

In this configuration, as illustrated in FIGS. 3 and 4, the steering angle sensing apparatus (300) may be configured in such a manner that the stator (200) is separately manufactured into the unit stator teeth (210, 220), and the plurality of unit stator teeth (210, 220) is bound in response to necessary dimensions to thereby reduce the manufacturing cost and to cater to various standards or dimensions, whereby a stable function can be performed by improving the magnetization characteristics.

Furthermore, as illustrated in FIG. 5 in terms of structure, an inner surface of the ring-shaped first magnet (130) included in the rotor according to the exemplary embodiment of the present disclosure may be coupled by the input shaft (10). The input shaft (10) may be connected to a steering wheel (not shown) of a vehicle, where a driver rotates the steering wheel by manipulating the steering wheel, whereby the first magnet (130) is rotated in association with the input shaft (10). The first magnet (130) may be coupled to a periphery of the input shaft (10) by the rotor holder (110). In this case, the aforementioned yoke member (120) may be further included. Furthermore, a cover (C) at an upper side of the apparatus (300), a first case (80) at a bottom side and a second case (90) may be included to accommodate the stator (200) and angle sensor module.

Furthermore, as shown in FIG. 3, the stator (200) may be formed by allowing a plurality of unit stator teeth (210, 220) to be bound in a ring shape. Then, inner surfaces of the magnet (130) and the stator (200) may be mutually distanced and oppositely arranged.

Still furthermore, a coupling part (24) may be protruded from a bottom end of the stator (200). The coupling part (24) may be coupled by the output shaft (11), for example. In this case, the output shaft (11) is connected to a front wheel of a vehicle contacting a road, where the output shaft (11) and the input shaft (10) may be connected by a torsion bar (not shown). At this time, when a driver rotates a steering wheel, the torsion bar connecting the output shaft (11) and the input shaft (10) is generated with a twist torque by a frictional resistance with the road and the front wheel. When the twist torque is generated on the torsion bar, a rotational angle of the first magnet (130) connected to the input shaft (10) and that of the stator (200) connected to the output shaft (11) become mutually different by the twist torque, whereby the stator (200) and the first magnet (130) perform a relative movement.

In this configuration, when the rotational angles of the first magnet (130) and the stator (200) are mutually different, a magnetic field is generated between the first magnet (130) and the stator (200) by the difference of rotational angles of the first magnet (130) and the stator (200). The magnetic field generated between the first magnet (130) and the stator (200) is detected by a magnetic field sensor (84), and the intensity of magnetic field detected by the magnetic field sensor (84) is transmitted to an ECU (Electric Control Unit) of a vehicle. In this case, the ECU compares an intensity of a preset magnetic field and an intensity of magnetic field detected by the magnetic field sensor (84) to calculate a steering torque, and a user can generate an auxiliary manipulating power necessary for manipulating a steering wheel from an EPS (Electric Power Steering) motor.

In the structure illustrated in FIG. 5, the first case (80) accommodates the stator (200). The first case (80) is opened at an upper end in order to accommodate the stator (200) and is formed at a bottom end with a through hole (82) adequate to allow the coupling part (24) protruded from the stator (200) to pass therethrough.

Hereafter, an angle sensor module interacting with the torque sensor module will be described with reference to FIG. 5.

In general, the angle sensor module is such that the main gear (32) attached to a steering shaft is rotated in association with the rotation of the steering wheel driven by a driver to generate a difference in rotational angle, whereby a Hall IC recognizes the magnetic field of the magnets (40, 50) attached to the sub gears (34, 36) attached to the main gear (32) and the rotational direction and transmits a signal to the ECU.

To be more specific, the gear module (30), the second magnet (40) and the third magnet (50) on the apparatus (300) according to an exemplary embodiment of the present disclosure enable a user to sense a steering angle of the steering wheel. Thus, the gear module (30) may be configured by including the main gear (32), the first sub gear (34) and the second sub gear (36). In this case, the main gear (32) is press-fitted into a periphery of the coupling part (24) protruded from the stator (200), and a periphery of the main gear (32) is formed with a set of teeth. The main gear (32) is coupled to the coupling part (24), where the coupling part (24) is coupled to the output shaft (11) to allow the main gear (32) to rotate in association with the rotation of the output shaft (11).

In addition, in order to prevent the main gear (32) from slipping from a periphery of the coupling part (24), the main gear (32) and the coupling part (24) may be respectively formed with a hitching lug (not shown) or a hitching groove (not shown) coupled to the hitching lug.

The first sub gear (34) included in the gear module may take a disc shape and may be formed at a periphery of the first sub gear (34) with a set of teeth, for example. In this configuration, the first sub gear (34) is directly meshed with the set of teeth of the main gear (32), where the first sub gear (34) and the main gear (32) may be aligned in a parallel manner. The first sub gear (34) and the main gear (32) may include a first gear ratio, for example. Furthermore, the second sub gear (36) may take a disc shape and may be formed at a periphery of the second sub gear (36) with a set of teeth, for example. In this configuration, the second sub gear (36) is directly meshed with the set of teeth of the main gear (32) as in the first sub gear (34), where the second sub gear (36) and the main gear (32) may include a second gear ratio, for example.

That is, each of the first sub gear (34) and the second sub gear (36) in the structure of gear module may be directly meshed with the main gear (32). When the first and second sub gears (34, 36) are directly meshed with the main gear (32), the backlash can be greatly reduced over a case when the main gear (32) is directly meshed with the first sub gear (34) and a case when the first sub gear (34) is directly meshed with the second sub gear (36).

Figure 6:
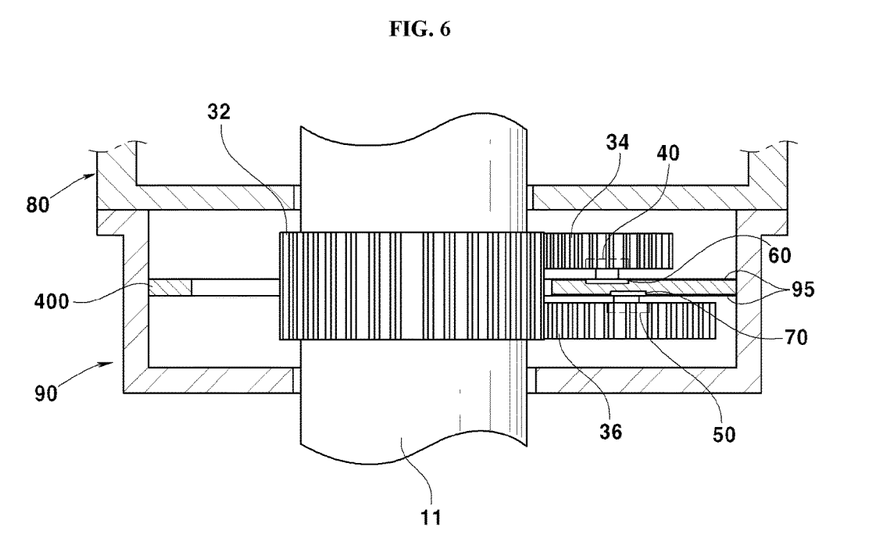
FIG. 6 is a cross-sectional view illustrating essential parts of a gear module of FIG. 5.

FIG. 6 is a cross-sectional view illustrating essential parts of a gear module of FIG. 5

Referring to FIGS. 5 and 6, the second magnet (40) may be disposed at a rotational center of the first sub gear (34), and the third magnet (50) may be disposed at a rotational center of the second sub gear (36). The second case (90) may be coupled to a bottom surface of the first case (80), and the second case (90) may be opened at an upper end, and formed at a bottom end with a through hole (92) to allow the output shaft (11) to pass therethrough.

A first magnet sensor (60) may be disposed at an upper surface of the PCB (Printed Circuit Board, 400, described later) facing the second magnet (40) fixed to a rotational center of the first sub gear (34). The first magnet sensor (60) may transmit a signal generated by measuring a rotational angle of the second magnet (40) to the ECU. In addition, a second magnet sensor (70) may be disposed at a bottom surface of the PCB (Printed Circuit Board, 400, described later) facing the third magnet (50) fixed to a rotational center of the second sub gear (36). The second magnet sensor (70) may transmit a signal generated by measuring a rotational angle of the third magnet (50) to the ECU. Thereafter, the ECU can calculate signals respectively outputted from the first and second magnet sensors (60, 70) and calculate a rotational angle of the steering wheel as a result of the aforesaid calculation.

In the exemplary embodiment of the present disclosure, the rotational angle of steering wheel calculated from the ECU may be calculated by respectively sensing the second and third magnets (40, 50) arranged at rotational centers of the first and second sub gears (34, 36) meshed with the main gear (32) of the gear module (30) by the first and second magnet sensors (60, 70). In addition, when the first and second sub gear (34, 36) are directly meshed to the main gear (32) of the gear module (30) as in the exemplary embodiment of the present disclosure, backlash generated among the main gear (32), the first and second sub gears (34, 36) can be reduced, and as a result of reduced backlash, a deviation between an actual rotational angle of the output shaft (11) and the rotational angle sensed by the first and second magnet sensors (60, 70) can be greatly reduced.

Furthermore, the apparatus (200) according to an exemplary embodiment of the present disclosure may further comprise a PCB (400, Printed Circuit Board). The PCB (400) may take a doughnut shape having an opening, and may be rotatably coupled at both surfaces by first and second sub gears (34, 36), for example. The PCB (400) may be disposed in parallel with the main gear (32), the first sub gear (34) and the second sub gear (36), for example, where the first sub gear (34) and the second sub gear (36) may be directly meshed with the main gear (32). An upper surface of the PCB (400) and a bottom surface facing the upper surface of the PCB (400) may be respectively disposed with the first and second magnet sensors (60, 70).

In this configuration, the first magnet sensor (60) disposed at the upper surface of the PCB (400) may sense a rotational angle of the second magnet (40) and transmit the sensed signal to the ECU, and the second magnet sensor (70) may sense a rotational angle of the third magnet (50) and transmit a sensed signal to the ECU.

The ECU may calculate a steering angle by calculating the sensed signals transmitted from the first and second magnet sensors (60, 70). When the first sub gear (34) and the second magnet (40) and the second sub gear (36) and the third magnet (50) are disposed at both sides of the PCB (400), the magnetic fields respectively generated from the second magnet (40) and the third magnet (50) may generate a mutual interference to cause the first and second magnet sensors (60, 70) to be influenced by the mutual interference. In order to prevent the mutual interference, at least any one surface of both sides of the PCB (400) corresponding to the first and second sub gears (34, 36) may be disposed or mounted with a magnetic cut-off film (95). The magnetic interferences respectively generated form the second and third magnets (40, 50) can be prevented by the magnetic cut-off film (95).

The torque sensor module according to an exemplary embodiment of the present disclosure may include a rotor holder (110), a rotor (100) including a first magnet (130) disposed at a periphery of the rotor holder (110), and a stator (200) discretely disposed at a periphery of the rotor (100). At this time, the stator (200) may be formed by coupling of divided plurality of unit stator teeth (210, 220). Each of the divided plurality of unit stator teeth (210, 220) may include a circumferentially extended header part (211), and a tooth (212) extended by being bent to a vertical direction from the head part (211). The plurality of unit stator teeth (210, 220) may include a first stator tooth (210) including a first head part (210) and a seconds stator tooth (220) including a second head part most adjacently positioned with the first head part in the plurality of unit stator teeth (210, 220).

The first and second head parts may be discretely disposed. The first and second head parts may be coupled by a coupling member. The first and second head parts may be coupled by a binding part. The binding part may be formed by the first and second head parts being directly fused. The plurality of unit stator teeth (210, 220) may be identical in terms of size and shape of tooth (212) to that of the head part (211).

The torque sensor module according to an exemplary embodiment of the present disclosure may include a magnetic field sensor (84) detecting changes in magnetic field in response to movement of the first magnet (130) and a collector (500) disposed at the stator (200) to apply the changes in magnetic field in response to the movement of the first magnet (130). The number of the plurality of unit stator teeth (210, 220) may be of an integer ratio of the number of electrodes magnetized to the first magnet (130). The plurality of unit stator teeth (210, 220) may be disposed to a circumferential direction, and adjacent unit stator teeth (210, 220) may be mutually and alternately disposed. The rotor (100) may be coupled to an input shaft (10), and the stator (220) may be coupled to an output shaft (11).

An apparatus for sensing a steering angle (i.e., a steering angle sensing apparatus, 300) may be formed by including: a rotor (100) including a rotor holder (110) and a first magnet (130) disposed at a periphery of the rotor holder (110); a stator (200) disposed at an external side of the rotor (100) by being spaced apart from the rotor (100), and a gear module (30) interacting by being coupled to the stator (200), wherein the stator (200) is formed by allowing a plurality of divided unit stator teeth (210, 220) to be coupled.

The gear module (30) may include a main gear (32) interacting with the stator(200), a first sub gear (34) and a second sub gear (36) coupled to the main gear (32), wherein each rotational center of the first sub gear(34) and the second sub gear (36) may be disposed with a second magnet (40) and a third magnet (50).

The first magnet (130) may be coupled to the input shaft (10) or the output shaft (11), and magnetized to an axial direction. The first magnet (130) may take a ring-shape having a hollow hole at an inside with a shape of a horizontal cross-section having an external diameter and a minor diameter.

A method for manufacturing a stator according to an exemplary embodiment of the present disclosure may include: preparing a plate-type substrate material (a); and cutting a plurality of unit stator teeth from the substrate material (b), wherein the plurality of unit stator teeth may include a first stator tooth having a first tooth and a first head part extended from the first tooth, and a second stator tooth having a second tooth most adjacently positioned to the first tooth and the substrate material, and a second head part extended from the second tooth, and wherein the (b) step of cutting the plurality of unit stator teeth from the substrate material includes aligning the first stator tooth and the second stator tooth to allow the first head part to be positioned at an upper surface of the substrate material and to allow the second head part to be positioned at a bottom surface of the substrate material.

The method may further comprise: after (b) step, bending teeth relative to the head part from the plurality of unit stator teeth cut at the (b) step (c); and coupling the plurality of unit stator teeth by aligning the plurality of unit stator teeth to a circumferential direction (d). The plurality of unit stator teeth at the (d) step may be so coupled as to allow adjacent head parts to be mutually positioned in a zigzagged way. Coupling of among the plurality of unit stator teeth at the (d) step may be made by any one or more methods of an insert molding, an ultrasonic fusion, a thermal fusion, a caulking and a bonding.

Although the abovementioned embodiments according to the present disclosure have been described in detail with reference to the above specific examples, the embodiments are, however, intended to be illustrative only, and thereby do not limit the scope of protection of the present disclosure. Thereby, it should be appreciated by the skilled in the art that changes, modifications and amendments to the above examples may be made without deviating from the scope of protection of the disclosure.

The invention claimed is:

1. An apparatus for sensing a steering angle, the apparatus comprising:
a rotor including a rotor holder, and a first magnet disposed at a periphery of the rotor holder, wherein the first magnet is coupled either to an input shaft or an output shaft, and magnetized to an axial direction;
a stator formed by being distanced from a periphery of the rotor, and coupled by allowing a plurality of unit stators to be coupled by being divided, and arranged to a radial direction of a periphery of the first magnet, wherein each of the plurality of unit stators separately includes a head part and a tooth that extends in a bent direction from the corresponding head part;

a gear module including a main gear coupled to a bottom side of the stator to rotate along with the stator, and a plurality of sub gears including a second magnet and a third magnet to rotate with the main gear, wherein the plurality of sub gears includes a first sub gear and a second sub gear each meshed to teeth of the main gear, and the second magnet and the third magnet are respectively arranged at a rotational center of the first sub gear and the second sub gear; and a PCB (Printed Circuit Board) arranged in parallel between the second magnet and the third magnet, wherein the plurality of unit stators are disposed such that adjacent teeth are mutually disposed in a zigzag way.

2. The apparatus for sensing a steering angle of claim 1, wherein the plurality of unit stators are configured such that mutually adjacent unit stators and alignment directions of teeth extended from the corresponding head part are mutually alternately arranged.

3. The apparatus for sensing a steering angle of claim 1, wherein each of the unit stators is the same in terms of size of the head part and the tooth.

4. The apparatus for sensing a steering angle of claim 2, wherein a total number of the plurality of unit stators is of an integer ratio of a total number of electrodes magnetized to the first magnet.

5. The apparatus for sensing a steering angle of claim 1, wherein the first magnet is provided in a ring-shape having a hollow hole at an inside with a shape of a horizontal cross-section forming an external diameter and a minor diameter.

6. The apparatus for sensing a steering angle of claim 1, wherein a first magnet sensor is arranged at a surface opposite to the first sub gear on an external surface of the PCB, and a second magnet sensor is arranged at a surface opposite to the second sub gear on an external surface of the PCB.

7. The apparatus for sensing a steering angle of claim 1, wherein the first sub gear and the second sub gear are formed with mutually different gear ratios.

8. The apparatus for sensing a steering angle of claim 1, wherein at least one surface of an external surface on the PCB is formed with a magnetic shielding film in order to prevent mutual interferences of magnetic fields.

9. The apparatus for sensing a steering angle of claim 1, wherein a binding part coupled by two head part is provided between mutually adjacent unit stators in the plurality of unit stators.

10. The apparatus for sensing a steering angle of claim 9, wherein the binding part is formed by allowing the head part of each of the unit stators to be directly melted.

11. An electronic power steering system, the system comprising:

an apparatus for sensing a steering angle; and an electronic control unit configured to drive a motor in response to an operation condition detected by the apparatus for sensing a steering angle, wherein the apparatus for sensing a steering angle includes:

a rotor including a rotor holder, and a first magnet disposed at a periphery of the rotor holder;

a stator formed by being distanced from a periphery of the rotor, and coupled by allowing a plurality of unit stators to be coupled by being divided, and arranged to a radial direction of a periphery of the first magnet, wherein each of the plurality of unit stators separately includes a head part and a tooth that extends in a bent direction from the corresponding head part;

a gear module including a main gear coupled to a bottom side of the stator to rotate along with the stator, and a plurality of sub gears including a second magnet and a third magnet to rotate with the main gear, wherein the plurality of sub gears includes a first sub gear and a second sub gear each meshed to teeth of the main gear, and the second magnet and the third magnet are respectively arranged at a rotational center of the first sub gear and the second sub gear; and a PCB (Printed Circuit Board) arranged in parallel between the second magnet and the third magnet, wherein the plurality of unit stators are disposed such that adjacent teeth are mutually disposed in a zigzag way.

12. The electronic power steering system of claim 11, wherein a binding part coupled by two head parts is provided between mutually adjacent unit stators in the plurality of unit stators.

* * * * *